United States Patent
Klabisch et al.

(10) Patent No.: US 7,070,040 B2
(45) Date of Patent: Jul. 4, 2006

(54) TOGGLE AND TOGGLE CONNECTION ASSEMBLY

(75) Inventors: Adam Klabisch, Dortmund (DE); Klaus Duhnke, Bochum (DE); Norbert Hesse, Bochum (DE); Gerhard Siepenkort, Lunen (DE); Uwe Tillessen, Kamen (DE)

(73) Assignee: DBT GmbH, Lunen (DE)

( * ) Notice: Subject to any disclaimer, the term of this patent is extended or adjusted under 35 U.S.C. 154(b) by 52 days.

(21) Appl. No.: 10/839,088

(22) Filed: May 5, 2004

(65) Prior Publication Data

US 2004/0222067 A1 Nov. 11, 2004

(30) Foreign Application Priority Data

May 7, 2003 (DE) .......................... 203 07 151 U

(51) Int. Cl.
*B65G 19/28* (2006.01)
*B65G 21/00* (2006.01)

(52) U.S. Cl. .............................. 198/735.2; 198/735.1; 198/735.6; 198/860.2

(58) Field of Classification Search ............. 198/735.2, 198/735.6, 860.2, 735.1; B65G 19/28
See application file for complete search history.

(56) References Cited

U.S. PATENT DOCUMENTS

2001/0020570 A1 * 9/2001 Schmidt et al. .......... 198/735.6

FOREIGN PATENT DOCUMENTS

| DE | 1945208 | | 3/1970 |
|----|---------|----|--------|
| DE | 2352289 | | 11/1974 |
| DE | 3511494 | | 10/1986 |
| DE | 3645321 | | 3/1988 |
| DE | 3933883 | A1 * | 4/1991 |
| DE | 4005785 | | 9/1991 |
| DE | 10011288 | | 9/2001 |
| DE | 20114165 | | 4/2002 |
| DE | 10212694 | A1 * | 10/2003 |
| GB | 2088311 | A * | 6/1982 |

* cited by examiner

*Primary Examiner*—Gene O. Crawford
*Assistant Examiner*—Leslie August Nicholson, III
(74) *Attorney, Agent, or Firm*—Fay, Sharpe, Fagan, Minnich & McKee, LLP

(57) ABSTRACT

Toggles are disclosed for toggle connections of conveyor pans of a chain scraper conveyor or conveyor troughs of a mining machine guide. In providing a toggle and a toggle connection, with which high axial forces can be transmitted while, at the same time, maintaining high angular mobility of the pans and troughs, shoulder areas of the toggle are designed so as to be spherical. Because of the spherical design of the shoulder areas, the vertical mobility of adjoining conveyor pans is improved while at the same time the transmission of axial tensile forces to the toggle heads is optimized.

28 Claims, 2 Drawing Sheets

TOGGLE AND TOGGLE CONNECTION ASSEMBLY

FIELD OF THE INVENTION

The present invention relates to a toggle or a coupling component for a toggle connection assembly adapted for use with conveyor pans of a chain scraper conveyor or for guide troughs of a mining machine guide. In particular, the present invention relates to a toggle having two toggle heads which are connected in one piece via a shaft, the width of which is tapered. The toggle heads, on the side facing the shaft, have shoulder areas that slope downwardly in the direction of the shaft. The present invention also relates to a toggle connection that utilizes a suitable toggle and corresponding toggle pockets that are defined in the pans and troughs. The toggle, having the toggle heads that are connected in one piece via the shaft, can be inserted into the toggle pockets. The toggle pockets have downwardly inclined stop faces which interact with shoulder areas on the toggle heads of the toggle.

BACKGROUND OF THE INVENTION

In underground mining operations, many configurations of a toggle and a toggle connection for connecting the conveyor pans of chain scraper conveyors or guide troughs of mining machine guides are known. In mining practice, especially toggle connections in which the toggle in axial extension of the shaft has bolt pins on both toggle heads, the bolt pins, in the coupled state, extend behind bolt areas in the toggle pockets and are secured against laterally falling out of the laterally open toggle pockets. The bolt area on the toggle pockets can comprise bolt bridges rigidly disposed on the toggle pockets or detachable retention elements.

German Patent DE 36 45 321 C2 describes a generic toggle which has a hook-shaped bolt pin disposed on one toggle head and a wider rectangular bolt pin disposed on the other toggle head. On the back end relative to the butt joint, one toggle pocket has a bolt pocket in the form of an undercutting. The toggle pocket engages the bolt hook. The other toggle pocket is open on the back region and ends in an approximately rectangular profile opening of the toggle pocket. In the assembled state, the wider bolt tongue is located in the transition section between the toggle pocket and the profile opening and is secured in place by use of a plate-like swivel bolt which is rounded on both ends of the plate. In the assembled state, one end of the plate is located in a trough which is formed on the side of the toggle pocket that faces the sill of the seam. The other end of the plate is detachably affixed by use of a clamping sleeve to wall projections which are disposed on the lateral wall of the toggle pocket facing the roof of the seam and which have holes for driving in the clamping sleeve. Above its wider bolt tongue, the toggle head has a slot so that no forces can be transmitted to the swivel bolt even when the toggle is engaged in an axial movement, thus preventing an unintentional detachment of the swivel bolt. The lower side of the hook-shaped bolt attachment tapers conically towards the upper side of the bolt attachment, thus allowing the toggle to be attached obliquely to the toggle pocket and to be subsequently swiveled downwardly. The bottom of the two toggle pockets is completely flat. Furthermore, the shoulder areas on the toggle heads and the stop faces on the toggle pockets extend in a straight line diagonal to the longitudinal axis of the shaft, and the shoulder areas of the toggle abut the stop faces without undercuttings.

German Patent DE 100 11 288 A1 describes a toggle and a toggle connection for conveyor pans and guide troughs in which two symmetrically designed toggle pockets are attached to the adjoining ends of the pans and troughs, with the toggle having symmetrically designed toggle heads with bolt tongues. The bolt tongues project with a nearly constant but, relative to the thickness of the toggle heads, considerably lower thickness from the toggle heads. The upper and lower sides of the bolt tongues are plane parallel to one another, and the toggle is prevented from laterally falling out by use of detachable retention bolts on the toggle pockets, with the retention bolts being provided for both bolt tongues. Both retention bolts have two deformable clamping sleeves each disposed on them. The clamping sleeves can be locked in semicircular recesses on opposite wall projections of both long sides of the toggle pockets. Because of the symmetrical configuration of both of the toggle pockets and of the toggles and the retention elements, orientation errors during the assembly can be avoided. The shoulder areas and stop faces run diagonally to the longitudinal axis of the toggle shaft and the toggle pockets and are designed as flat wedge surfaces.

In underground mining operations, the toggles and the toggle pockets are subjected to extremely high wear. The toggle heads of the toggles must absorb all axial forces between neighboring conveyor pans and guide troughs that are generated by the mining machine which travels up and down while changing directions and/or by the passing scrapers of the chain scraper conveyor. At the same time, the toggles and the toggle pockets must ensure a sufficient angular mobility between the adjoining conveyor pans since saddles and troughs in the sill of the seam must be compensated for and since a chain scraper conveyor or a mining machine guide can move only pan by pan or trough by trough.

SUMMARY OF THE INVENTION

Thus, the problem to be solved by the present invention is to make available a toggle and a toggle connection with which high axial forces can be transmitted while ensuring high angular mobility and simple assembly of the toggles.

This problem with respect to the toggle is solved in that the shoulder areas have a spherical design, in particular a rounded spherical design. Because of the spherical design of the shoulder area and the thus resultant punctiform or linear contact surface between the shoulder areas on the toggle heads and the associated stop faces on the toggle pockets, the vertical mobility of adjoining conveyor pans necessary to compensate for troughs or saddles in the sill of the seam is improved and, at the same time, the transmission of axial tensile forces to the toggle heads is optimized. Because of the defined force transmission of the transmitted forces between the shoulder areas and the stop faces, surface pressures are avoided in underground mining operations.

In a preferred embodiment, both toggle heads, on the head end facing away from the shaft, have a bolt tongue—which projects in the axial direction and the cross section or thickness of which relative to the toggle head is tapered—and/or the toggle heads, shoulder areas and bolt tongues are symmetrically designed about the center of the shaft. Errors in the assembly of the toggle due to erroneous positioning of the toggle in the toggle pockets are avoided because the construction provides for a symmetrical design. In a preferred embodiment, the radius of curvature of the head end on jointing surfaces on the sides of the bolt tongues may be of identical size as, or smaller than, the radius of curvature of the shoulder areas. The radius of curvature of the jointing surface of the head end above the bolt tongue may differ from the radius of curvature on the jointing surfaces on the sides of the bolt tongue and may be as large or substantially as large as the radius of curvature on the shoulder area. Because of the smaller radius of curvature on the head end along the sides of the bolt tongues, pressures on the head end are avoided even if there are maximum vertical angular differences between adjacent conveyor pans.

The outer side faces of the toggle heads may also be designed so as to be preferably flat and plane parallel relative to the mean longitudinal plane of the toggle. The spherical or circularly rounded regions of the shoulder areas can extend with a constant radius of curvature from the shaft to the lateral faces and/or the rounded regions on the head ends can extend with a constant radius of curvature over the jointing surface above the bolt tongues and the jointing surfaces on the sides of the bolt tongues.

In an especially preferred embodiment, the toggle heads—at least on the lower side of the toggle heads and/or also on the upper side of the toggle heads—are curved, especially rounded, throughout the width, i.e., from the surface of one side to that of the other side. In this case, the radius of curvature on the lower and upper side of the toggle heads can especially be the same as the radius of curvature on the shoulder areas. Because of the rounded regions of the toggle heads throughout the width, the vertical and horizontal mobility of adjacent pans or guide troughs is additionally improved. The radius of curvature on the shoulder areas and/or jointing surfaces can preferably be smaller than the distance between the lateral surfaces on the toggle heads and larger than the maximum depth of the shaft and the maximum depth of the toggle heads.

When mounting the toggle according to the present invention, it is useful if on the upper side of the bolt tongues and on the lower side of the bolt tongues, the bolt tongues taper conically toward their front ends. The upper side of the bolt tongues and the lower side of the bolt tongues can be designed so as to be substantially plane across the width of the bolt tongues. It is also preferable if the toggle shaft has an oval cross section and/or if the toggle shaft at its midpoint has a tapered area that acts as a predetermined breaking point, thus ensuring that even on excessive wear and tear on the toggle connection, damage to the conveyor pans and the toggle pockets attached thereto can be avoided because of the predetermined breaking points in the toggle.

The toggle connection according to the present invention is characterized in that the shoulder areas have a spherical, in particular a rounded spherical design, and that the stop faces, at least in the region of the zone of contact with the shoulder areas also have a slightly spherical design. The stop faces may utilize a straight-line plane configuration. It is especially useful if the toggle pockets for the toggle connection according to the present invention are designed differently from each other and if one of the two toggle pockets has a bolt attachment disposed on the back surface of the pocket, which bolt attachment is joined by casting and extends partially over the opening of the pocket, so that an undercutting for mating of the bolt tongue with the associated toggle head is formed below the bolt attachment. To mount the toggle, it is especially preferred if the bottom of the toggle pocket with the bolt attachment disposed on it has a depression, preferably an oblique depression which increases as the distance from the joint increases, so that when mounting or dismounting, one of the two bolt tongues can be inserted into the depression. To ensure an interaction with the oblique lower side of the bolt tongues, one side of the toggle, when mounting it, can be placed with a toggle head on the bottom of the toggle pocket and can subsequently be swiveled.

It is also preferable if the depth of the bottom of both toggle pockets from the back side of the pocket to the front side of the pocket increases at the joint between adjacent toggle pockets, with the bottom of both toggle pockets being preferably designed in the form of a trough. On the front side that projects into the pocket, the bolt attachment preferably has a trough, preferably a trough with a circular trough bottom, so as to ensure an optimum angular mobility of the toggle heads. In this configuration, the ends of the toggle heads are rounded, relative to the bolt attachments. On the back side of the pocket, the other toggle pocket preferably has a feedthrough opening leading to a second pocket recess in which a multiple-part toggle retention element for affixing the second toggle tongue can be detachably inserted and locked.

In this case, the toggle retention element preferably completely fills the pocket recess in the axial direction so as to prevent axial movements of the toggle head in the direction of the feedthrough opening. Independently of the configuration of the toggles, the configuration of the two toggle pockets which can be joined by casting to or, as separate parts, by welding onto the conveyor pans or guide troughs can be separate and have independent inventive significance.

BRIEF DESCRIPTION OF THE DRAWINGS

The present invention will now be described in greater detail with reference to a practical example which is shown in the drawings. In the drawings.

DETAILED DESCRIPTION OF THE PREFERRED EMBODIMENTS

Figure 1:
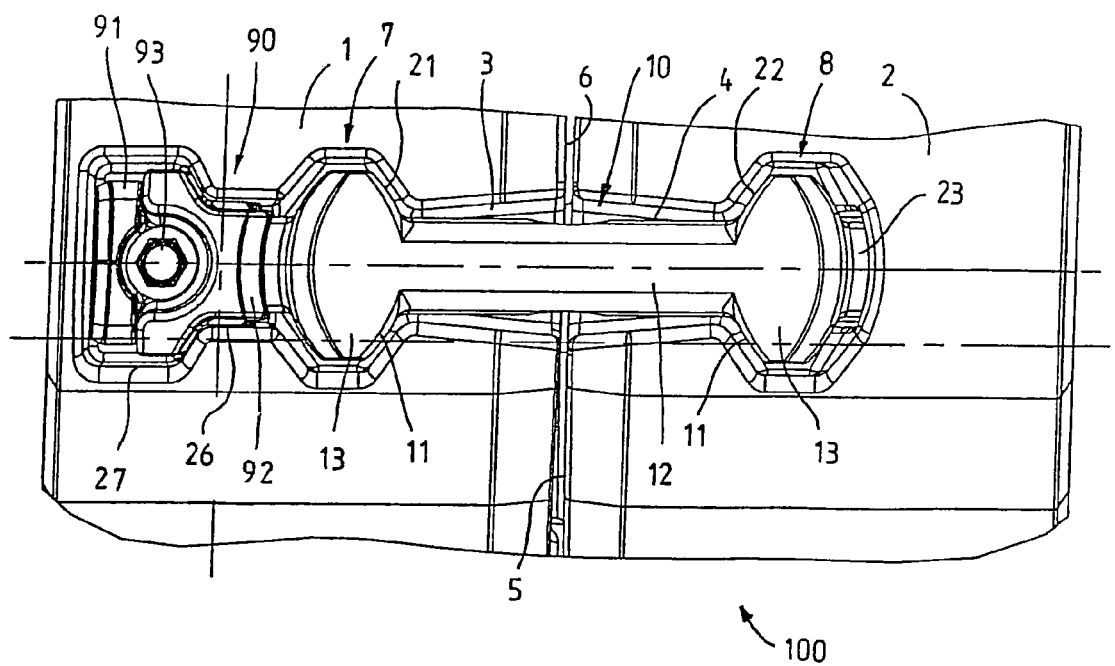
FIG. 1 shows a preferred toggle connection assembly with a preferred toggle bolt according to the present invention with a lateral view of the toggle pockets.
Figure 2:
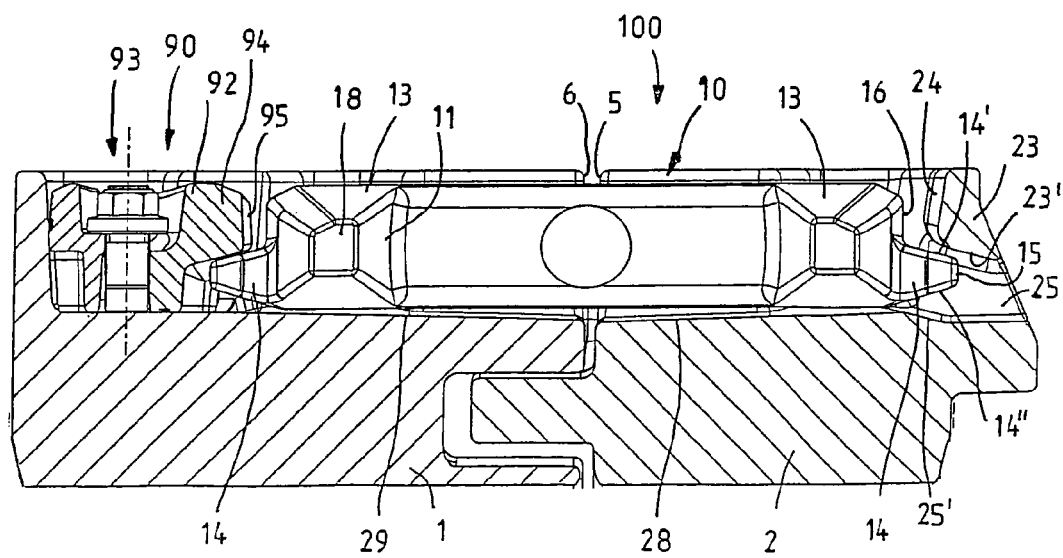
FIG. 2 shows a section through the toggle pockets of FIG. 1 with a lateral view of the toggle.

FIGS. 1 and 2 show a toggle connection assembly, which in its entirety is designated by the reference numeral 100, for connecting conveyor pans (not shown) of a chain scraper conveyor or guide troughs (not shown) of a mining machine guide used in underground mining operations in a tension-proof and angularly movable manner with one another. Toggle connection assembly 100 comprises a first toggle pocket 1 and a second toggle pocket 2 which, on the associated pans and troughs, are joined either by welding them on as welded pieces or by directly casting them on. Each of the two toggle pockets 1,2 forms a toggle holding pocket 3 and 4 for one of the two halves of the toggle, which in its entirety is designated by reference numeral 10. Each toggle holding pocket comprises a shaft holding section which conically tapers beginning on the front sides of toggle pockets 5 and 6, which shaft holding section ends in a head holding section 7 and 8. Relative to each respectively other toggle pocket 2,1, the two head holding sections 7,8 have oblique stop faces 21,22, the surface of which is straight-line plane or slight spherically curved. Shoulder areas 11 of toggle 10 come to sit close to stop faces 21,22 of toggle pockets 1,2. The shoulder areas 11 are formed on the side—that faces shaft 12—of toggle heads 13 which are connected via shaft 12. Shoulder areas 11 of the two toggle heads 13 slope obliquely toward shaft 12 and have a spherical, circularly curved surface. Relative to stop faces 21,22 and the shaft holding pockets, toggle holding pockets 3,4 are mirror images of one another, and toggle heads 13 are supported on the associated stop faces 21,22 via two shoulder areas 11 on both sides of shaft 12.

Toggle 10 has one bolt tongue 14 each on the two toggle heads 13. The bolt tongue 14 tapers conically toward its front end 15, with both the upper side 14' of the bolt tongue and the lower side 14" of the bolt tongue being straight-line plane and with both inclining obliquely downwardly with respect to the horizontal plane and approaching each other so that the bolt tongue is conically tapered toward its front end 15. Toggle 10 is secured by use of bolt tongues 14 in the laterally open toggle pockets 1,2 by one or more suitable retention elements. Toggle connection assembly 100 according to the present invention comprises a retention element that is rigidly integrated in one of the toggle pockets as well as a detachable retention element. The rigidly connected retention element comprises a bolt attachment 23 which is formed in one piece with the back side of toggle holding pocket 4 of toggle pocket 2 and which, on its front surface 24 which projects into toggle head holding space 8. The bolt attachment 23 has a trough, so as to keep surface pressures between the associated head end 16 of toggle head 13 and bolt attachment 23 at a minimum and to facilitate movements of the toggle head in a manner similar to a ball and socket joint. Below bolt attachment 23, toggle pocket 2 has a through slot 25, the bottom section 25' of which proceeds in the form of a depression obliquely downwardly toward the connected conveyor pan or guide trough. Bottom section 25' runs substantially parallel to the lower side 23' of the bolt attachment to ensure that when mounting toggle 10, the toggle can be attached obliquely to toggle pocket 2 and, with bolt attachment 2344, can be inserted relatively deep down into through slot 25. The oppositely lying toggle pocket 1, in the area next to toggle head holding space 7, has a feedthrough opening 26 and a nearly rectangular profile opening 27 into which a multiple-part retention element 90 which extends over bolt tongue 14 on the associated toggle head 13 can be detachably inserted. Retention element 90 comprises a filler element 91 and a bolt element 92 which are connected to each other via a screw joint 93, with a bolt lug 94 being disposed on bolt element 92, which bolt lug is also rounded on front side 95 and which extends over bolt tongue 14. Retention element 90 is the subject matter of a parallel patent application, for which reason no other explanation is here provided.

Figure 3:
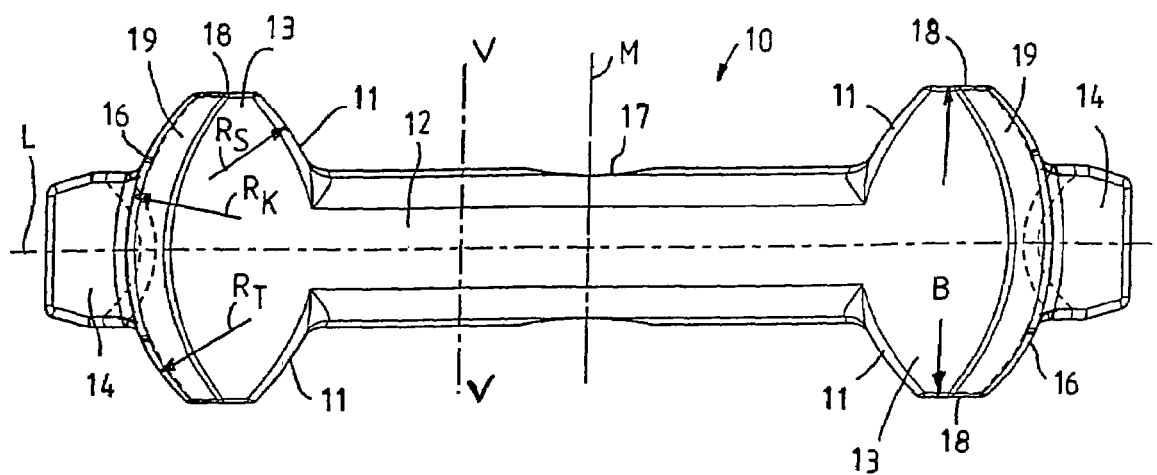
FIG. 3 shows a plan view of a preferred toggle according to the present invention.
Figure 4:
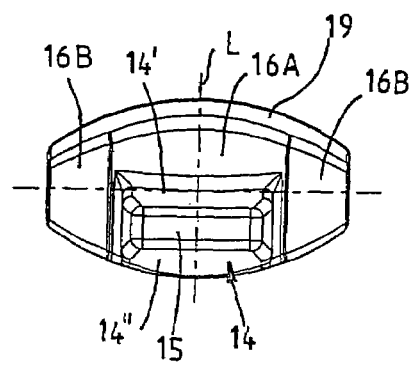
FIG. 4 shows a lateral view of the toggle of FIG. 3.
Figure 5:
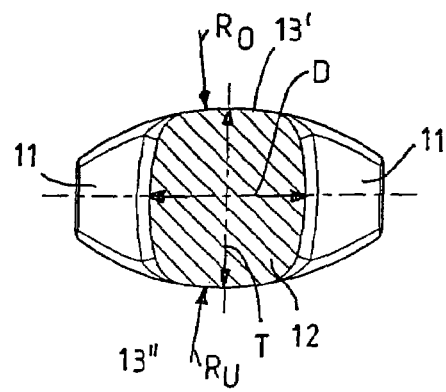
FIG. 5 shows a sectional view along line V—V seen in FIG. 3.

The constructive geometrical design of toggle 10 will now be explained in greater detail with reference to FIGS. 3 through 5. Toggle 10 is designed so as to be mirror symmetrical with respect to the perpendicular longitudinal center plane L and to the center plane M which halves shaft 12, and the two toggle heads 13 have the two conically tapering bolt tongues 14 on head end 16 facing away from shaft 12, as already explained earlier. Nearly across its entire axial length, shaft 12 has a substantially constant oval cross section, with toggle depth T being greater than toggle thickness D. In the region of shaft 12 and in the region of toggle heads 13, the maximum toggle depth T on the longitudinal center plane L is constant. In the region of shaft 12 and in the region of both toggle heads 13, the upper side and the lower side of toggle 10 is rounded in a dish shaped manner with a uniform radius of curvature of $R_O$ and $R_U$, respectively, with the two radii of curvature preferably being of the same size, and, in the preferred underground mining operations, having a radius of curvature of R=100 mm about centers of curvature on the longitudinal center plane L. As FIG. 3 shows, however, at midpoint of the shaft, shaft 12 has a depression 17 which narrows the shaft thickness D, thus forming a predetermined breaking point in shaft 12.

Facing shoulder areas 11 on the oppositely lying toggle heads 13 run between lateral sides 18 of the toggle heads, which lateral sides are straight-line plane and oriented parallel to the longitudinal center plane L, and the transition region toward shaft 12. The facing shoulder areas 11 are spherically rounded or circularly curved, having a radius of curvature $R_S$. The spherical shoulder areas 11 can therefore roll without pressure off the associated stop faces (21, FIG. 1) of toggle pockets 1,2 even when the conveyor pans are sharply angled with respect to one another. Head ends 16 of toggle heads 13 are curved on jointing surfaces 16A above bolt tongues 14 with a radius of curvature $R_K$ and on jointing surfaces 16B on the sides of bolt tongues 14 with a radius of curvature $R_T$. In the practical example shown, the radii of curvature $R_S$, $R_K$, $R_O$ and $R_U$ have the same size and are located between distance B of the two straight-line plane lateral sides 18 and shaft depth T. Radius of curvature $R_T$ is approximately 20% smaller than $R_K$. The distance B, and consequently the width of toggle 10 in the region of toggle heads 13, is nearly twice as large as the shaft thickness D of shaft 12.

Upper surfaces 13' of the toggle heads which, between two lateral sides 18, are curved with a radius of curvature $R_O$ about centers of curvature in the longitudinal center plane L, have a transition section 19 in the transition region to the curved toggle end 16. The transition section between the two lateral sides 18 is also curved and forms an oblique transition region between the curved upper sides 13' of the toggle heads and the approximately perpendicularly oriented toggle ends 16. In addition, the figures show that toggle 10, which is preferably a casting, has rounded transition regions in the transition region between the four shoulder areas 11 and shaft 12, between shoulder areas 11 and upper and lower sides 13', 13" of the toggle, between the toggle head ends 16 and the bolt tongues 14, etc.

FIG. 2 also shows that the two toggle pockets 1,2 have a pocket bottom 28,29 which is sloped toward the joint between the two toggle pockets 1,2 and that the depth of the two toggle holding pockets 3,4 increases from the back side to the front side 6,5 so that only the toggle heads 13 of toggles 10 are in direct contact with the pocket bottoms 28,29. The bottom of each toggle pocket can be in the form of a trough.

Modifications of the preceding description contemplated by those skilled in the art are assumed to be within the scope of protection of the claims. The practical example with identical radii of curvature on the head ends, the shoulder areas and the upper and lower sides of the toggles and with a radius of curvature on the lateral jointing surfaces that is smaller by approximately 20% is a preferred practical example. The radii of curvature can also differ from each other.

Although many of the surfaces are described herein as spherical or rounded, it will be understood that the surfaces may also exhibit an arcuate configuration. That is, one or more of the noted surfaces may be defined by (i) more than one radius of curvature, (ii) two or more different radii taken from a common center point, or (iii) two or more different or the same radii taken from different center points. The term "arcuate" as used herein is in its broadest sense and generally includes any nonplanar surface that, when viewed in cross section, extends along at least one curve or arc.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A toggle adapted for use in toggle connections of conveyor pans of a chain scraper conveyor or for guide troughs of a mining machine guide, the toggle comprising two toggle heads which are connected in one piece with one another by a shaft extending therebetween, each toggle head defining an oppositely directed head end, the width of the shaft being tapered, wherein the toggle heads define shoulder areas on the side facing the shaft, the shoulder areas sloping toward the shaft, and the shoulder areas having a spherical configuration, and wherein the toggle heads are rounded at least on (i) the lower side of the toggle and (ii) on the upper side of the toggle from one side to the other, with the radius of curvature ($R_O$,$R_U$) on the lower side of the toggle or the upper side of the toggle being identical to the radius of curvature ($R_S$) on the shoulder areas.

2. The toggle as claimed in claim 1, wherein both toggle heads on the head end facing away from the shaft include an axially projecting bolt tongue which, relative to the toggle head, has a tapered cross section.

3. The toggle as claimed in claim 1, wherein both toggle heads on the head end facing away from the shaft include an axially projecting bolt tongue, both toggle heads, their respective shoulder areas, and their bolt tongues are symmetrical with respect to a center axis of the shaft.

4. The toggle as claimed in claim 1, wherein the toggle heads include a bolt tongue and in at least one of the regions of (i) on the sides and (ii) above the bolt tongue, have rounded jointing surfaces.

5. The toggle as claimed in claim 4, wherein the radius of curvature ($R_T$) on the sides of the head end on the jointing surfaces is as large as the radius of curvature ($R_S$) of the shoulder areas.

6. The toggle as claimed in claim 4, wherein the radius of curvature ($R_T$) on the sides of the head end on the jointing surfaces is smaller than the radius of curvature ($R_S$) of the shoulder areas.

7. The toggle as claimed in claim 4, wherein the radius of curvature ($R_K$) of the head end above the bolt tongue on the jointing surface is as large as the radius of curvature ($R_S$) on the shoulder area.

8. The toggle as claimed in claim 1, wherein the outer side areas of the toggle heads are straight-line plane and plane parallel to the longitudinal center plane (L) of the toggle.

9. The toggle as claimed in claim 1, wherein the spherically rounded regions on the shoulder areas extend with a constant radius of curvature ($R_S$) approximately from the shaft to lateral sides of the toggle heads.

10. The toggle as claimed in claim 1, wherein the toggle heads include a bolt tongue and the rounded regions on the head ends extend with a constant radius of curvature ($R_K$; $R_T$) across a jointing surface above the bolt tongues and across the jointing surfaces along the sides of the bolt tongues.

11. The toggle as claimed in claim 2, wherein the bolt tongues define upper and lower sides, the upper and lower sides of the bolt tongues taper conically.

12. The toggle as claimed in claim 11 wherein the upper and lower sides of the bolt tongues taper in a straight-line plane toward their ends.

13. The toggle as claimed in claim 1, wherein the shaft has an oval cross section.

14. The toggle as claimed in claim 1, wherein the shaft defines a predetermined breaking point.

15. A toggle adapted for use in toggle connections of conveyor pans of a chain scraper conveyor or for guide troughs of a mining machine guide, the toggle comprising two toggle heads which are connected in one piece with one another by a shaft extending therebetween, each toggle head defining an oppositely directed head end, the width of the shaft being tapered, wherein the toggle heads define shoulder areas on the side facing the shaft, the shoulder areas sloping toward the shaft, and the shoulder areas having a spherical configuration, and wherein the radius of curvature ($R_S$) on the shoulder areas is smaller than the distance (B) of the side areas on the toggle heads and larger than the maximum depth (T) of the shaft or the maximum depth (T) of the toggle heads.

16. The toggle as claimed in claim 15, wherein both toggle heads on the head end facing away from the shaft include an axially projecting bolt tongue which, relative to the toggle head, has a tapered cross section.

17. The toggle as claimed in claim 15, wherein both toggle heads on the head end facing away from the shaft include an axially projecting bolt tongue, both toggle heads, their respective shoulder areas, and their bolt tongues are symmetrical with respect to a center axis of the shaft.

18. The toggle as claimed in claim 15, wherein the toggle heads include a bolt tongue and in at least one of the regions of (i) on the sides and (ii) above the bolt tongue, have rounded jointing surfaces.

19. The toggle as claimed in claim 18, wherein the radius of curvature ($R_T$) on the sides of the head end on the jointing surfaces is as large as the radius of curvature ($R_S$) of the shoulder areas.

20. The toggle as claimed in claim 18, wherein the radius of curvature ($R_T$) on the sides of the head end on the jointing surfaces is smaller than the radius of curvature ($R_S$) of the shoulder areas.

21. The toggle as claimed in claim 18, wherein the radius of curvature ($R_K$) of the head end above the bolt tongue on the jointing surface is as large as the radius of curvature ($R_S$) on the shoulder area.

22. The toggle as claimed in claim 15, wherein the outer side areas of the toggle heads are straight-line plane and plane parallel to the longitudinal center plane (L) of the toggle.

23. The toggle as claimed in claim 15, wherein the spherically rounded regions on the shoulder areas extend with a constant radius of curvature ($R_S$) approximately from the shaft to lateral sides of the toggle heads.

24. The toggle as claimed in claim 15, wherein the tongue heads include a bolt tongue and the rounded regions on the head ends extend with a constant radius of curvature ($R_K$; $R_T$) across a jointing surface above the bolt tongues and across the jointing surfaces along the sides of the bolt tongues.

25. The toggle as claimed in claim 16, wherein the bolt tongues define upper and lower sides, the upper and lower sides of the bolt tongues taper conically.

26. The toggle as claimed in claim 25 wherein the upper and lower sides of the bolt tongues taper in a straight-line plane toward their ends.

27. The toggle as claimed in claim 15, wherein the shaft has an oval cross section.

28. The toggle as claimed in claim 15, wherein the shaft defines a predetermined breaking point.

* * * * *